United States Patent
Dublish et al.

(10) Patent No.: US 8,136,166 B2
(45) Date of Patent: *Mar. 13, 2012

(54) INSTALLATION OF BLACK BOX FOR TRUSTED COMPONENT FOR DIGITAL RIGHTS MANAGEMENT (DRM) ON COMPUTING DEVICE

(75) Inventors: Pratul Dublish, Sammamish, WA (US); Sean Lyndersay, Seattle, WA (US); Charlie D. Chase, Jr., Woodinville, WA (US); Caglar Gunyakti, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1370 days.

This patent is subject to a terminal disclaimer.

(21) Appl. No.: 11/516,813

(22) Filed: Sep. 6, 2006

(65) Prior Publication Data

US 2007/0067645 A1 Mar. 22, 2007

Related U.S. Application Data

(63) Continuation of application No. 10/274,630, filed on Oct. 21, 2002, now Pat. No. 7,152,245.

(51) Int. Cl.
*G06F 21/02* (2006.01)
*H04L 29/06* (2006.01)
*H04L 9/30* (2006.01)

(52) U.S. Cl. ........... 726/27; 726/1; 705/59; 713/156; 713/171; 713/175

(58) Field of Classification Search .................. None
See application file for complete search history.

(56) References Cited

U.S. PATENT DOCUMENTS

| | | | |
|---|---|---|---|
| 6,167,358 A | 12/2000 | Othmer et al. | 702/188 |
| 6,223,284 B1 * | 4/2001 | Novoa et al. | 713/100 |
| 6,490,352 B1 | 12/2002 | Schroeppel | 380/30 |
| 6,772,340 B1 * | 8/2004 | Peinado et al. | 713/168 |
| 6,816,596 B1 * | 11/2004 | Peinado et al. | 380/277 |
| 6,829,708 B1 * | 12/2004 | Peinado et al. | 713/156 |
| 6,954,738 B2 | 10/2005 | Wang et al. | 705/59 |
| 7,152,245 B2 * | 12/2006 | Dublish et al. | 726/29 |
| 7,203,966 B2 * | 4/2007 | Abburi et al. | 726/29 |
| 7,237,123 B2 * | 6/2007 | LeVine et al. | 713/193 |
| 7,318,236 B2 * | 1/2008 | DeMello et al. | 726/26 |
| 7,319,759 B1 * | 1/2008 | Peinado et al. | 380/277 |
| 7,353,209 B1 * | 4/2008 | Peinado et al. | 705/59 |
| 7,412,061 B2 * | 8/2008 | Peinado et al. | 380/277 |
| 7,426,750 B2 * | 9/2008 | Cooper et al. | 726/26 |
| 7,529,927 B2 * | 5/2009 | Peinado et al. | 713/156 |
| 7,757,077 B2 * | 7/2010 | Peinado et al. | 713/156 |
| 8,005,757 B2 * | 8/2011 | Peinado et al. | 705/51 |
| 8,028,165 B2 * | 9/2011 | Ali et al. | 713/167 |
| 2002/0013772 A1 * | 1/2002 | Peinado | 705/51 |
| 2003/0084306 A1 * | 5/2003 | Abburi et al. | 713/188 |
| 2004/0039916 A1 | 2/2004 | Aldis et al. | 713/177 |
| 2004/0078581 A1 * | 4/2004 | Dublish et al. | 713/189 |

* cited by examiner

*Primary Examiner* — Christopher Revak
(74) *Attorney, Agent, or Firm* — Woodcock Washburn LLP

(57) ABSTRACT

To install a black box on a computing device, an administrator has access to the computing device and queries same for machine properties thereof. The administrator sends the machine properties of the computing device to a black box server as part of a request for a new black box for the computing device. The black box server in response constructs the new black box based in part on the machine properties so as to tie the new black box to the computing device, and delivers the new black box to the administrator. The administrator thereafter installs the new black box on the computing device. The administrator may include an activation provider running on the computing device and an activation manager in communication with the activation provider. The administrator may also deactivate the black box if it determines that the black box is no longer trustworthy.

21 Claims, 4 Drawing Sheets

INSTALLATION OF BLACK BOX FOR TRUSTED COMPONENT FOR DIGITAL RIGHTS MANAGEMENT (DRM) ON COMPUTING DEVICE

CROSS-REFERENCE TO RELATED APPLICATION

This application is a continuation of U.S. patent application Ser. No. 10/274,630, filed Oct. 21, 2002, which is now U.S. Pat. No. 7,152,245, the content of which is incorporated by reference herein in its entirety.

TECHNICAL FIELD

The present invention relates to a system such as a digital rights management (DRM) system for enforcing rights in digital content. More specifically, the present invention relates to such an enforcement system that allows access to encrypted digital content on a computing device only in accordance with parameters specified by license rights acquired by a user of the digital content. Even more specifically, the present invention relates to installing and/or activating a cryptographic black box for a trusted component of the enforcement system on the computing device, and also removal and/or deactivating the black box.

BACKGROUND OF THE INVENTION

As is known, and referring now to FIG. 1, digital rights management (DRM) and enforcement system is highly desirable in connection with digital content 12 such as digital audio, digital video, digital text, digital data, digital multimedia, etc., where such digital content 12 is to be distributed to users. Upon being received by the user, such user renders or 'plays' the digital content with the aid of an appropriate rendering device such as a media player on a personal computer 14 or the like.

Typically, a content owner distributing such digital content 12 wishes to restrict what the user can do with such distributed digital content 12. For example, the content owner may wish to restrict the user from copying and re-distributing such content 12 to a second user, or may wish to allow distributed digital content 12 to be played only a limited number of times, only for a certain total time, only on a certain type of machine, only on a certain type of media player, only by a certain type of user, etc.

However, after distribution has occurred, such content owner has very little if any control over the digital content 12. A DRM system 10, then, allows the controlled rendering or playing of arbitrary forms of digital content 12, where such control is flexible and definable by the content owner of such digital content. Typically, content 12 is distributed to the user in the form of a package 13 by way of any appropriate distribution channel. The digital content package 13 as distributed may include the digital content 12 encrypted with a symmetric encryption/decryption key (KD), (i.e., (KD(CONTENT))), as well as other information identifying the content, how to acquire a license for such content, etc.

The trust-based DRM system 10 allows an owner of digital content 12 to specify license rules that must be satisfied before such digital content 12 is allowed to be rendered on a user's computing device 14. Such license rules can include the aforementioned temporal requirement, and may be embodied within a digital license 16 that the user/user's computing device 14 (hereinafter, such terms are interchangeable unless circumstances require otherwise) must obtain from the content owner or an agent thereof. Such license 16 also includes the decryption key (KD) for decrypting the digital content, perhaps encrypted according to a key decryptable by the user's computing device. Because the content 12 requires the license 16 for access thereto, then, the content 12 may be freely distributed. Significantly, the license 16 must somehow be bound either directly or indirectly to a computing device 14 on which the content 12 is to be rendered. Otherwise, the license 12 could potentially be copied to an infinite number of other devices 14 and rendered thereon, also.

The content owner for a piece of digital content 12 must trust that the user's computing device 14 will abide by the rules and requirements specified by such content owner in the license 16, i.e. that the digital content 12 will not be rendered unless the rules and requirements within the license 16 are satisfied. Preferably, then, the user's computing device 14 is provided with a trusted component or mechanism 18 that will not render the digital content 12 except according to the license rules embodied in the license 16 associated with the digital content 12 and obtained by the user.

The trusted component 18 typically has a license evaluator 20 that determines whether the license 16 is valid, reviews the license rules and requirements in such valid license 16, and determines based on the reviewed license rules and requirements whether the requesting user has the right to render the requested digital content 12 in the manner sought, among other things. As should be understood, the license evaluator 20 is trusted in the DRM system 10 to carry out the wishes of the owner of the digital content 12 according to the rules and requirements in the license 16, and the user should not be able to easily alter such trusted element for any purpose, nefarious or otherwise.

As should be understood, the rules and requirements in the license 16 can specify whether the user has rights to render the digital content 12 based on any of several factors, including who the user is, where the user is located, what type of computing device the user is using, what rendering application is calling the DRM system, the date, the time, etc. In addition, the rules and requirements of the license 16 may limit the license 16 to a pre-determined number of plays, or pre-determined play time, for example.

The rules and requirements may be specified in the license 16 according to any appropriate language and syntax. For example, the language may simply specify attributes and values that must be satisfied (DATE must be later than X, e.g.), or may require the performance of functions according to a specified script (IF DATE greater than X, THEN DO . . . , e.g.).

Upon the license evaluator 20 determining that the license 16 is valid and that the user satisfies the rules and requirements therein, the digital content 12 can then be rendered. In particular, to render the content 12, the decryption key (KD) is obtained from the license 12 and is applied to (KD(CONTENT)) from the content package 13 to result in the actual content 12, and the actual content 12 is then in fact rendered.

Typically, to perform cryptographic functions in the connection with the trusted component 18, including the aforementioned applying of (KD) to (KD(content)) and all other cryptographic functions, the trusted component 18 has a black box 22. As with the license evaluator 20, the black box 22 is trusted in the DRM system 10 to carry out the wishes of the owner of the digital content 12 according to the rules and requirements in the license 16, and the user should not be able to easily alter such trusted element for any purpose, nefarious or otherwise.

Typically, the black box 22 can be expected to perform both symmetric (single key) and asymmetric (public-private key pair) cryptographic encryption and/or decryption. In particular, the aforementioned decryption key (KD) is typically a symmetric key and is therefore transmitted in an encrypted form by being encrypted by another symmetric key or a public key or private key. Thus, to decrypt (KD(content)), and if for example it is the case that (KD) is encrypted by a public key (PU) (i.e., (PU(KD))), the black box 22 must first obtain the private key (PR) corresponding to (PU) and asymmetrically apply (PR) to (PU(KD)) to result in (KD), and then must symmetrically apply (KD) to (KD(content)) to result in the content.

Critically, the black box 22 is provided with a secret and is entrusted to not reveal the secret to anybody or anything. Thus, the secret is the basis for encrypting the content key (KD), either directly or indirectly, and only the black box 22 as the bearer of the secret can decrypt the content key (KD). Thus, the license 16 having (KD) encrypted according to the secret is tied or bound to the black box 22 thereby. Typically, the secret is the private key (PR-BB) of a key pair (PU-BB, PR-BB) that is unique or nearly unique to the black box 22, and the corresponding public key (PU-BB) of the black box 22 is employed to encrypt (KD), either directly or indirectly. Of paramount importance, the black box 22 must be able to hide (PR-BB) and protect same and related cryptographic code from tampering, and (PR-BB) and such code are therefore encapsulated in the black box. In order to prevent unrestricted duplication, the black box 22 is tied to one particular hardware machine. Typically, such tying is achieved by hard coding machine properties into the black box 22 and authenticating such machine properties at run time. The black box 22 is also entrusted to cryptographically authenticate other software components, typically by verifying proffered digital signatures, and thus can ensure that other components of the trusted system 18 on the user's computing device 14 and that proffered items such as licenses 16 have not been tampered with.

Significantly, the black box 22 is separate from the remainder of the trusted component 18 so as to isolate the cryptographic functionality therein. As a result, maintaining the integrity of the trusted component 18 is achieved by maintaining the integrity of the (much smaller) black box 22, and security for the trusted component 18 is thus focused on the black box 22. As should be appreciated, then, the software code for the black box 22 is typically heavily obfuscated by means of a variety of techniques intended to maintain the integrity of such code and to hide the secret of the black box 22. In addition, the black box 22 is individualized so that each black box 22 hides a unique or nearly unique (PR-BB). Also, the executable code of each black box 22 may be individualized to have a unique or nearly unique binary image, even though all black boxes are functionally equivalent.

Bearing in mind that a nefarious entity may nevertheless defeat or 'break into' the black box 22, such black box 22 should be revocable and field upgradeable. Typically, each black box 22 is accompanied by a digital certificate bearing (PU-BB), a unique ID, and a version number. The certificate is thus tied to the black box 22 through the correspondence of (PU-BB) and (PR-BB). An issuer of a license 16 can decide to accept or reject a request for a license 16 from the trusted component 18 based on the certificate of the black box 22 thereof and the contents therein. In the event that a request is rejected, a newer black box 22 typically must be installed before the request is accepted. Of course, a new black box 22 may be installed for other reasons, may be initially installed separate from the installation of the remainder of the trusted component 18, may be installed with the remainder of the trusted component but not activated, etc.

The process of obtaining and installing a black box 22 on the user's computing device 14 along with a machine certificate that certifies the public key (PU-BB) of the black box 22 is also referred to as machine activation. To obtain an individualized black box 22, a user's computing device 14 typically accesses a black box server 24 by way of a network such as the Internet or the like and sends machine properties thereof to the black box server 24 as part of a request for a new black box 22. The black box server 24 in response constructs the new black box 22 based in part on the machine properties so as to tie the new black box 22 to the computing device 14, and then delivers the new black box 22 and machine certificate to the computing device 14 and installs same in a protected location on the computing device 14. Notably, the black box 22 and machine certificate are installed in the protected location, such as a protected system folder, to prevent a user from accidentally or deliberately deleting such items. Accordingly, a malicious user cannot deny service to other users if the computing device 14 is shared.

As should be appreciated, then, machine activation/installation of the black box 22 requires that the computing device 14 have network access to the black box server 24, and that the user of the computing device 14 have the necessary privileges to install the new black box 22 in the protected location. Conversely, lack of such network access or such necessary privileges prevents such machine activation.

Accordingly, a need exists for a system and method for installing a black box 22 for a trusted component 18 residing on a user's computing device 14. More particularly, a need exists for a system and method for remotely installing the black box 22 regardless of the privileges of the user of the computing device 14, and even more particularly, a need exists for a system and method for remotely installing the black box 22 in the situation where the black box server 24 is not necessarily directly network-accessible to the computing device 14.

SUMMARY OF THE INVENTION

The aforementioned needs are satisfied at least in part by the present invention in which a system installs a black box on a computing device. The black box operates in combination with a trusted component on the computing device, where the trusted component employs the black box to decrypt encrypted content for being rendered on the computing device only when rights and restrictions specified in a license corresponding to the encrypted content so allow.

In the system, an administrator has access to the computing device and queries same for machine properties thereof. A black box server is in communication with the administrator, and the administrator sends the machine properties of the computing device to the black box server as part of a request for a new black box for the computing device. The black box server in response constructs the new black box based in part on the machine properties so as to tie the new black box to the computing device, and delivers the new black box to the administrator. The administrator thereafter installs the new black box on the computing device.

The administrator may comprise an activation provider running on the computing device and an activation manager in communication with the activation provider. Thus, the activation provider determines the machine properties of the computing device and sends same to the activation manager, and the activation manager sends the request to the black box server and receives the new black box in response thereto.

Thereafter, the activation provider receives the new black box from the activation manager and installs same on the computing device.

The administrator may also be operated to remove or disable the black box on the computing device if it determines based on activation state information from the computing device that the black box on the computing device is no longer trustworthy.

BRIEF DESCRIPTION OF THE DRAWINGS

The foregoing summary, as well as the following detailed description of the embodiments of the present invention, will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings.

DETAILED DESCRIPTION OF THE INVENTION

Computer Environment

Figure 1:
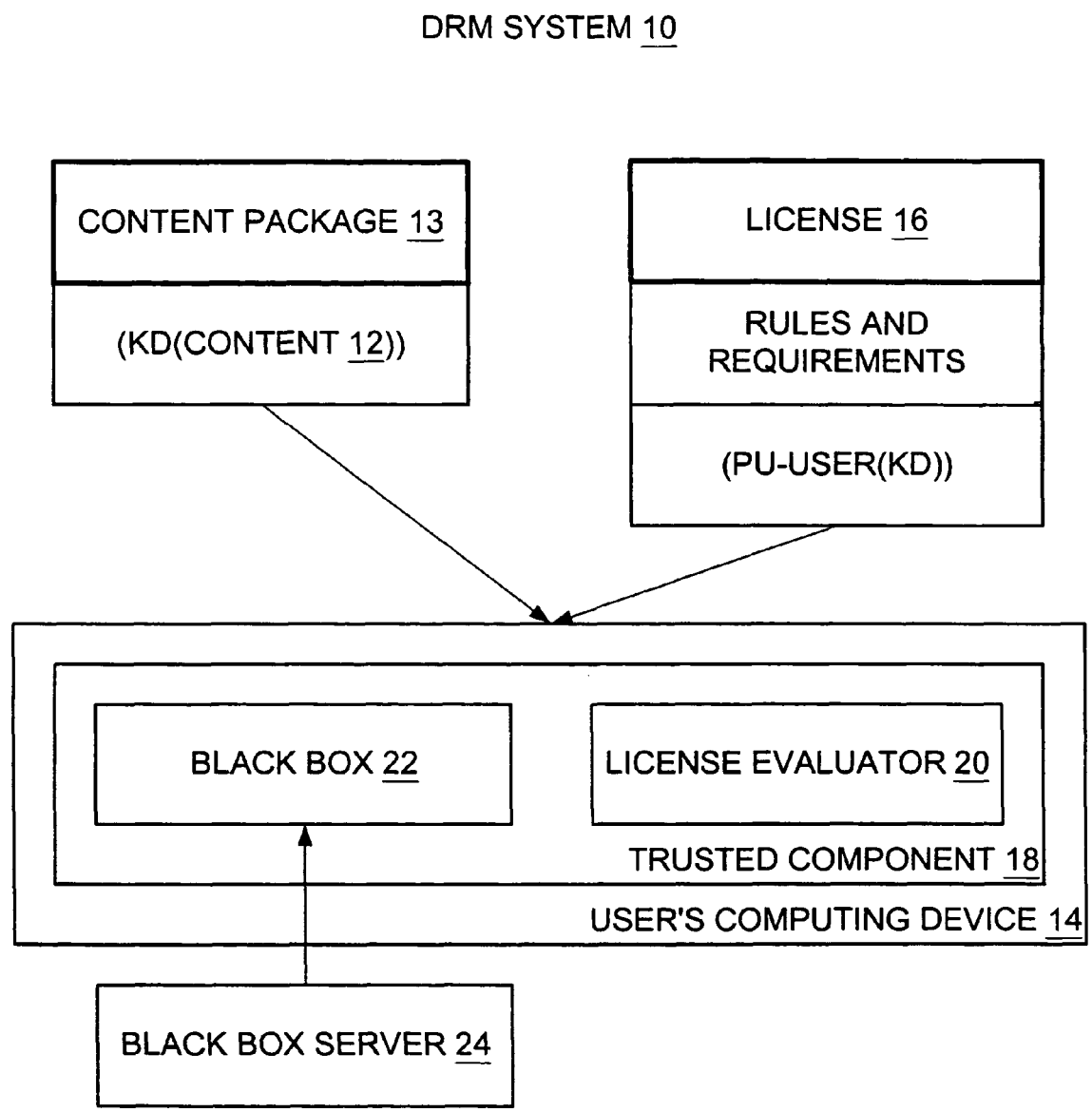
FIG. 1 is a block diagram showing an enforcement architecture of an example of a trust-based system.

FIG. 1 and the following discussion are intended to provide a brief general description of a suitable computing environment in which the present invention and/or portions thereof may be implemented. Although not required, the invention is described in the general context of computer-executable instructions, such as program modules, being executed by a computer, such as a client workstation or a server. Generally, program modules include routines, programs, objects, components, data structures and the like that perform particular tasks or implement particular abstract data types. Moreover, it should be appreciated that the invention and/or portions thereof may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

Figure 2:
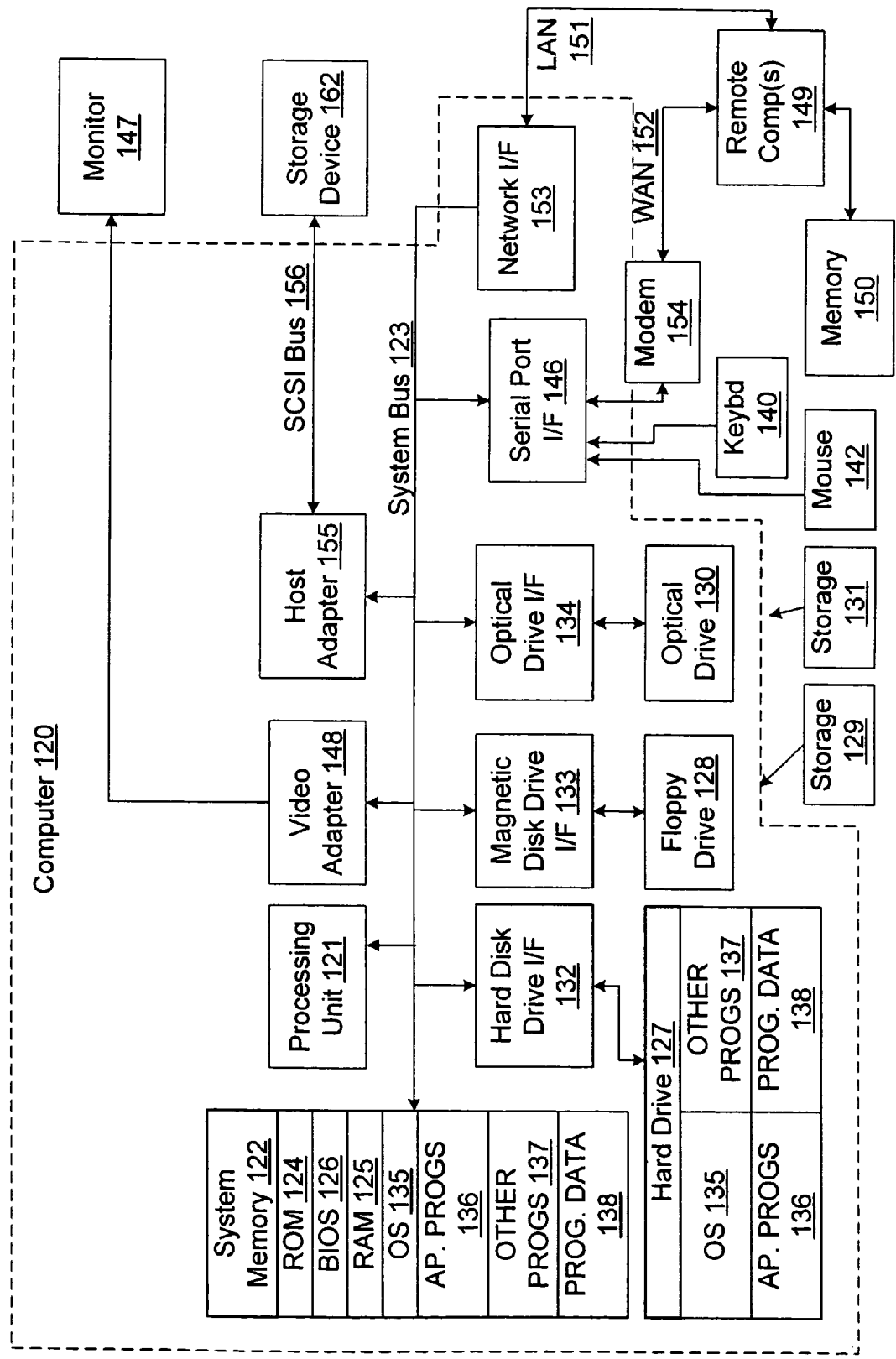
FIG. 2 is a block diagram representing a general purpose computer system in which aspects of the present invention and/or portions thereof may be incorporated.

As shown in FIG. 2, an exemplary general purpose computing system includes a conventional personal computer 120 or the like, including a processing unit 121, a system memory 122, and a system bus 123 that couples various system components including the system memory to the processing unit 121; The system bus 123 may be any of several types of bus structures including a memory bus or memory controller, a peripheral bus, and a local bus using any of a variety of bus architectures. The system memory includes read-only memory (ROM) 124 and random access memory (RAM) 125. A basic input/output system 126 (BIOS), containing the basic routines that help to transfer information between elements within the personal computer 120, such as during start-up, is stored in ROM 124.

The personal computer 120 may further include a hard disk drive 127 for reading from and writing to a hard disk (not shown), a magnetic disk drive 128 for reading from or writing to a removable magnetic disk 129, and an optical disk drive 130 for reading from or writing to a removable optical disk 131 such as a CD-ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide non-volatile storage of computer readable instructions, data structures, program modules and other data for the personal computer 20.

Although the exemplary environment described herein employs a hard disk, a removable magnetic disk 129, and a removable optical disk 131, it should be appreciated that other types of computer readable media which can store data that is accessible by a computer may also be used in the exemplary operating environment. Such other types of media include a magnetic cassette, a flash memory card, a digital video disk, a Bernoulli cartridge, a random access memory (RAM), a read-only memory (ROM), and the like.

A number of program modules may be stored on the hard disk, magnetic disk 129, optical disk 131, ROM 124 or RAM 125, including an operating system 135, one or more application programs 136, other program modules 137 and program data 138. A user may enter commands and information into the personal computer 120 through input devices such as a keyboard 140 and pointing device 142. Other input devices (not shown) may include a microphone, joystick, game pad, satellite disk, scanner, or the like. These and other input devices are often connected to the processing unit 121 through a serial port interface 146 that is coupled to the system bus, but may be connected by other interfaces, such as a parallel port, game port, or universal serial bus (USB). A monitor 147 or other type of display device is also connected to the system bus 123 via an interface, such as a video adapter 148. In addition to the monitor 147, a personal computer typically includes other peripheral output devices (not shown), such as speakers and printers. The exemplary system of FIG. 2 also includes a host adapter 155, a Small Computer System Interface (SCSI) bus 156, and an external storage device 162 connected to the SCSI bus 156.

The personal computer 120 may operate in a networked environment using logical connections to one or more remote computers, such as a remote computer 149. The remote computer 149 may be another personal computer, a server, a router, a network PC, a peer device or other common network node, and typically includes many or all of the elements described above relative to the personal computer 120, although only a memory storage device 150 has been illustrated in FIG. 2. The logical connections depicted in FIG. 2 include a local area network (LAN) 151 and a wide area network (WAN) 152. Such networking environments are commonplace in offices, enterprise-wide computer networks, intranets, and the Internet. The personal computer 120 may also act as a host to a guest such as another personal computer 120, a more specialized device such as a portable player or portable data assistant, or the like, whereby the host downloads data to and/or uploads data from the guest, among other things.

When used in a LAN networking environment, the personal computer 120 is connected to the LAN 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

Black Box Installation/Activation

As was set forth above, the security of a DRM system 10 is dependent on a trusted component 18 on a user's computing device 14, where the trusted component 18 includes a black box 22 for performing cryptographic functions. Thus, the black box 22 as installed on the user's computing device 14 is responsible for enforcing the rights and restrictions specified in a license 16 for DRM-protected content 12. The process of obtaining and installing a black box 22 on the user's computing device 14 along with a machine certificate that certifies the public key (PU-BB) of the black box 22 is also referred to as machine activation.

In the present invention, installation of a black box 22/machine activation is achieved regardless of a user's privileges on the computing device 14 or whether the computing device 14 can network-access the black box server 24. In particular, in the present invention, an administrator with network access to the black box server 24 remotely queries the computing device 14 for machine properties thereof and sends the machine properties to the black box server 24 as part of a request for a new black box 22 for the computing device 14. As before, the black box server 24 in response constructs the new black box 22 based in part on the machine properties so as to tie the new black box 22 to the computing device 14. Here, though, the black box server 24 delivers the new black box 22 and machine certificate to the administrator and the administrator with appropriate privileges then installs same in a protected location on the computing device 14.

Figure 3:
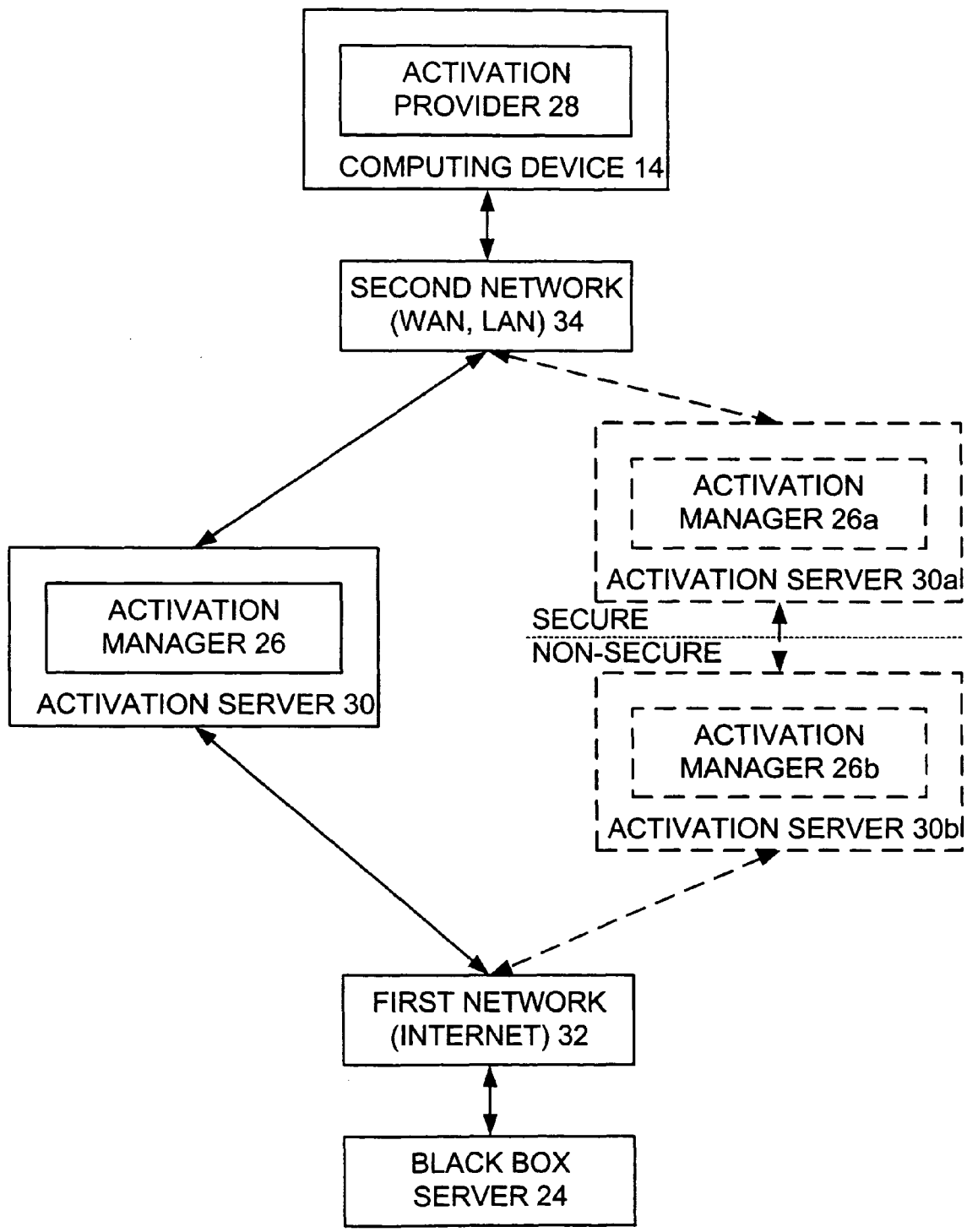
FIG. 3 is a block diagram of a digital rights management system including a computing device having a trusted component including a black box, an administrator including an activation provider on the computing device and an activation manager in communication with the activation provider for installing a new black box on the computing device, and a black box server for providing the new black box in accordance with one embodiment of the present invention.

In one embodiment of the present invention, and turning now to FIG. 3, the administrator with regard to a particular computing device 14 is represented by an activation manager 26 and an activation provider 28. The activation provider 28 runs on the computing device 14, and receives and processes commands from the activation manager 26. The activation provider 28 in particular determines the necessary machine properties of the computing device 14 and sends same to the activation manager 26. In addition, the activation provider 28 receives the new black box 22 and machine certificate from the activation manager 26 and installs same in the protected location on the computing device 14.

The activation manager 26 runs on an activation server 30 or other machine owned by or associated with the administrator: Significantly, and as seen in FIG. 3, such activation server 30 has network access to the black box server 24 by way of a first network 32, and therefore the activation manager 26 also has such network access to the black box server 24 by way of such first network 32. In addition, the activation server 30 and activation manager 26 also have network access to the computing device 14 and activation provider 28 by way of a second network 34. As shown in FIG. 3, the first network 32 may be separate from the second network 34, such as may be the case where the second network 34 is an internal network such as a LAN, WAN, Intranet, or the like and the first network 32 is an external network such as the Internet or the like. Thus, the activation server 30 bridges both networks 32, 34 and allows communication between the computing device 14 and the black box server 24 even in the case where the computing device 14 does not otherwise have access to the first network 32. Of course, the first network 32 and the second network 34 may also be one and the same without departing from the spirit and scope of the present invention.

In one embodiment of the present invention, the activation manager 26 and the activation provider 28 are constructed in accordance with a management implementation protocol such as the Windows Management Instrumentation (WMI) protocol, a product of MICROSOFT Corporation of Redmond, Wash. As may be appreciated, the WMI protocol allows for system management of a computing device 14. Thus, with the activation manager 26 and the activation provider 28 being WMI-based, such activation manager 26 and activation provider 28 can interact through available WMI infrastructure. Moreover, access to the activation provider 28 can be restricted to an administrator by placing such activation provider 28 in a restricted WMI namespace.

Generally, the activation manager 26 on the activation server 30 queries the activation provider 28 by way of the second network 34 for the machine properties of the computing device 14 thereof, sends a machine activation request by way of the first network 32 to the black box server 24, receives the new black box 22 and machine certificate by way of the first network 32 in response to the request, and forwards same to the activation provider 28 on the computing device 14 by way of the second network 34 for installation on such computing device 14 in the protected location thereon.

Inasmuch as the activation manager 26 communicates with both the first and second networks 32, 34, the activation server 30 typically is a dual-homed machine. Moreover, and in one embodiment of the present invention, the activation manager 26 can be physically split across two servers 30a, 30b or other machines in a high security environment. The sub-component 26a that communicates with the computing device 14 runs on server 30a, which is connected to the second network 34, and the sub-component 26b that communicates with the black box server 24 runs on server 30b, which is connected to the first network 32. The two sub-components 26a, 26b can communicate through some secure mechanism such as a firewall, a filtering router, a shared disk, or the like.

Figure 4:
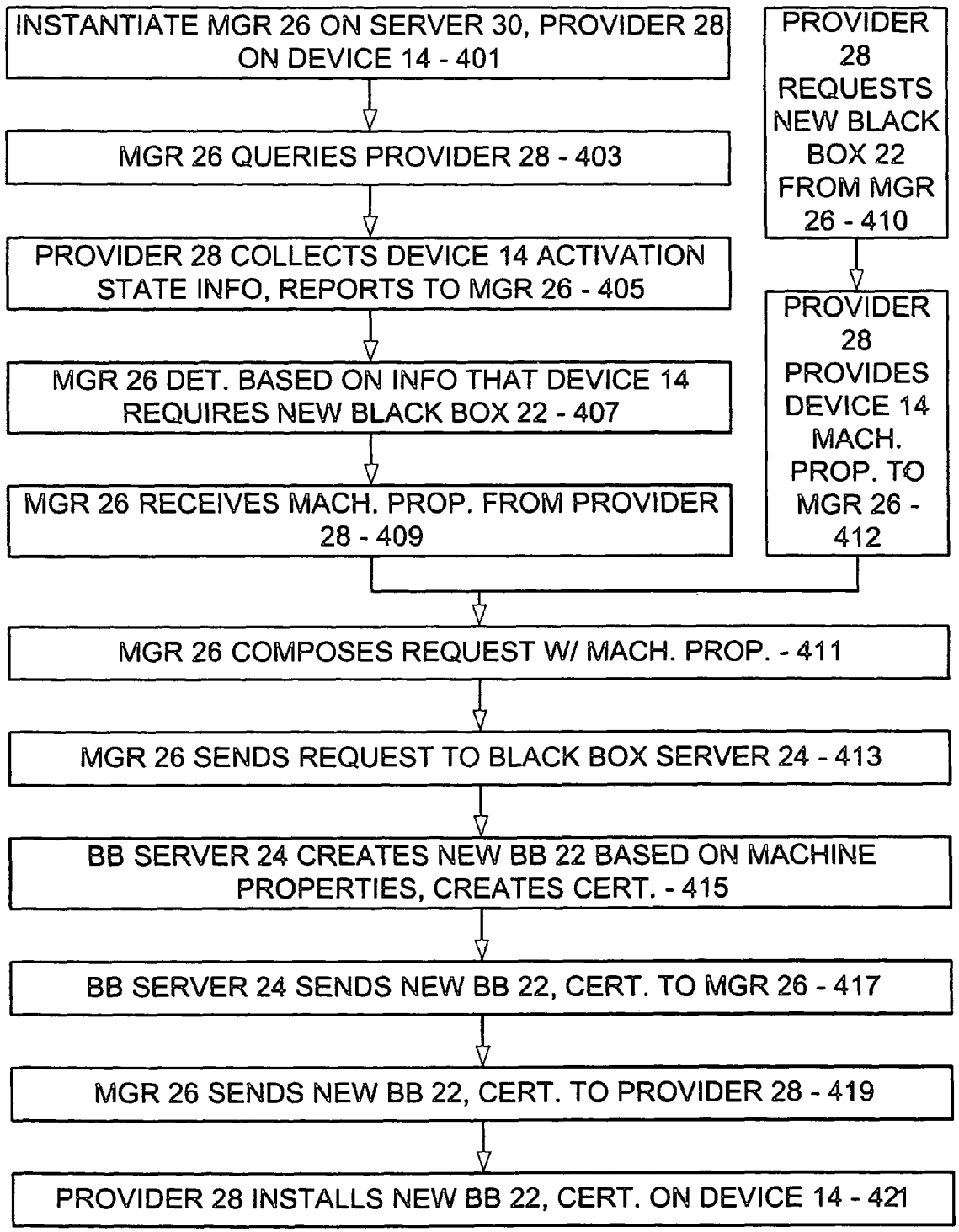
FIG. 4 is a flow diagram showing key steps performed in installing the new black box on the computing device in accordance with one embodiment of the present invention.

With the mechanism thus far disclosed and shown in FIG. 3, and referring now to FIG. 4, a process for remotely activating the computing device 14 to install a new black box 22 thereon is as follows:

Preliminarily, the activation manager 26 is instantiated on the activation server 30 and the activation provider 28 is instantiated on the computing device 14 (step 401). Note that the activation provider 28 may be a continuously available service to respond at any time to a query from the activation manager 26, or may be instantiated on demand by the activation manager 26. The activation manager 26 need not necessarily be continuously available unless the activation provider 28 is capable of initiating the query by such activation manager 26.

At some point, the activation manager 26 queries the activation provider 28 to determine whether the computing device 14 thereof requires a new black box 22 (step 403). Such query may be initiated on a regular basis, or may be initiated in response to a particular condition, such as for example the trusted component 18 on the computing device 14 determining that a new black box 22 is necessary and thus prompting the activation manager 26 for the query by way of the activation provider 28.

In response to the query from the activation manager 26, the activation provider 28 collects activation state information from the computing device 14 and reports same to the activation manager 26 (step 405). Such activation state information may for example include whether any black box 22 is present on the computing device 14, and if so, a version number thereof, a date of activation thereof, and the like. The activation manager 26 receives and reviews the activation state information and determines based thereon whether the computing device 14 requires a new black box 22 (step 407). Notably, such determination may be rule-based, such as for example according to a rules document setting out a plurality of rules, and therefore can be done based on most any criteria.

Assuming the activation manager 26 in fact determines that the computing device 14 requires a new black box 22, such activation manager 26 requests and receives relevant machine properties of the computing device 14 from the activation provider 28 (step 409). Alternatively, such machine properties are received from the activation provider in response to the query of step 403 along with the activation state information.

Also alternatively, the activation provider 28 may initiate the process itself without any query from the activation manager 26. In effect, in such a situation, the activation provider 28 requests a new black box 22 from the activation manager 26 without any prompting by such activation manager 26 (step 410), and as part of such request provides the relevant machine properties to the activation manager 26 (step 412).

At any rate, the activation manager 26 upon receiving the machine properties of the computing device 14 composes an activation request to include such machine properties (step 411), and sends the activation request to the black box server 24 (step 413). Note that in the instance where the activation manager 26 is actually a pair of sub-components 26a, 26b, the sub-component 26b that communicates with the black box server 24 by way of the first network 32 sends the activation request as at step 413, and may also compose same as at step 411. Correspondingly, the sub-component 26a that communicates with the activation provider 28 by way of the second network 32 performs steps 403, 407, and 409.

The black box server 24 receives the activation request and in response thereto creates a new black box 22 based on the activation request and in particular the machine properties contained therein, and also creates a corresponding machine certificate certifying the (PU-BB) for the created black box 22 and other attributes of the created black box 22 (step 415). Note that in creating the new black box 22 for the computing device, the black box server 24 selects a (PR-BB, PU-BB) key pair for the black box and hides (PR-BB) in the black box, and also ties the new black box 22 to the computing device 14 by hard coding the machine properties of the computing device 14 into the black box 22. Likewise, in creating the corresponding machine certificate, the black box server 24 places (PU-BB) in such certificate and signs the certificate based on the private key of such black box server 24. Creating the black box 22 and the machine certificate are known or should be apparent to the relevant public and therefore need not be disclosed herein in any detail. Accordingly, any appropriate method of creating the black box 22 and machine certificate may be employed without departing from the spirit and scope of the present invention.

Once created, the black box server 24 then sends the new black box 22 and corresponding machine certificate to the activation manager 26 and the activation manager 26 receives same (step 417). Again, in the instance where the activation manager 26 is actually a pair of sub-components 26a, 26b, the sub-component 26b that communicates with the black box server 24 by way of the first network 32 receives the new black box 22 and corresponding certificate as at step 417. The activation manager 26 may verify the new black box 22 and corresponding machine certificate, perhaps by way of an accompanying digital signature from the black box server 24.

Assuming the verification is successful, the activation manager 26 sends the new black box 22 and corresponding machine certificate to the activation provider 28 on the computing device 14 (step 419). Once again, in the instance where the activation manager 26 is actually a pair of sub-components 26a, 26b, the sub-component 26a that communicates with the activation provider 28 by way of the second network 34 receives the new black box 22 and corresponding certificate from the sub-component 26b and then sends same to such activation provider 28 as at step 419.

Finally, the activation provider 28 upon receiving the new black box 22 and corresponding machine certificate installs same into the protected location on the computing device 14 (step 421). In one embodiment of the present invention, the activation provider 28 on the computing device 14 assumes an administrator-type role to gain privileges necessary to write to the protected location on such computing device 14. Note that such role may be assumed by the activation provider 28 if the activation manager 26 delivers the new black box 22 in the form of a call to such activation provider 28 and if the activation manager 26 already has administrative privileges. Also note that the activation provider 28 may run on the computing device 14 in the context of a privileged system service that can only be accessed by an administrator or the like. Accordingly, an ordinary user will not be able to misuse the activation provider 28 on the computing device 14.

In one embodiment of the present invention, the activation provider 28 verifies the new black box 22 and the corresponding machine certificate before installing same on the computing device 14. Such verification provides protection against the misuse of activation provider 28 for installing malicious code on the computing device 14. To facilitate verification, the activation manager 26 should communicate to the activation provider 28 appropriate verification information as received from the black box server 24.

Note that the process as set forth above is with regard to installing a new black box 22 on a single computing device 14 on the second network 34. In one embodiment of the present invention, however, and as should be appreciated, the activation manager 26 may install a new black box 22 on each of a plurality of computing devices 14 on the second network 34, where each computing device 14 gets a unique or nearly unique black box 22 installed thereon. As may be evident, the process of installing black boxes 22 to a plurality of computing devices 14 is similar to the process of installing a black box 22 to a single computing device 14.

Generally, in installing black boxes 22 to a plurality of computing devices 14 on the second network 34, the activation manager 26 queries each computing device 14 for activation state information and machine properties as at steps 403 and 409. Thereafter, the activation manager 26 may issue a single batch activation request to the black box server 24 by way of the first network 32 as at steps 411 and 413, where the batch activation request is with regard to each of the plurality of computing devices 14. Alternatively, the activation manager 26 may issue a series of such activation requests. The black box server 24 then responds with a black box 22 and corresponding machine certificate for each of the plurality of computing devices 14 as at step 417, and the activation manager 26 then sends each black box 22 and corresponding machine certificate to the computing device 14 for which same was created, as at step 419.

Note that with an activation manager 26 on a second network 34 of computing devices 14, such activation manager can be configured to not only activate each computing device 14 by installing a new black box 22 thereon but also to deactivate each computing device 14 by removing or disabling the black box 22 thereon. Thus, an administrator for the second network 34 can specify an activation policy for the computing devices 14 thereon, where the activation policy specifies a minimum set of criteria that each computing device 14 must adhere to. Such activation policy may for example state a maximum age of the black box 22 on each computing device 14, a minimum acceptable version number, etc. Failure of a computing device 14 to adhere to the policy may result in the activation manager 26 obtaining a new black box 22 for such computing device 14, deactivation of the black box 22 currently on the computing device 14, or the like. Note that in the case where the activation manager 26 can deactivate the black box 22 on a computing device 14 by way of appropriate communications with the activation provider 28 on the computing device 14, such activation provider 28 should not itself be deactivated by any user. Otherwise, deactivation of the activation provider 28 could be undertaken by a nefarious user to prevent deactivation of the black box 22.

The second network 34 upon which the computing devices 14 reside may be a trusted or non-trusted network. If trusted, communications between the activation manager 26 and the activation providers 28 need not be protected in any special manner. Conversely, if not trusted, such communications should be protected, for example by appropriate cryptographic technology or the like.

CONCLUSION

Although the present invention is especially useful in connection with a computing device 14 such as a personal computer or the like, the present invention may be practiced with regard to any appropriate device, all without departing from the spirit and scope of the present invention, such as for example a server, an intelligent appliance, a networked portable device, etc. Accordingly, the device 14 is to be interpreted to encompass any appropriate device requiring installation of a black box 22 thereon.

The programming necessary to effectuate the processes performed in connection with the present invention is relatively straight-forward and should be apparent to the relevant programming public. Accordingly, such programming is not attached hereto. Any particular programming, then, may be employed to effectuate the present invention without departing from the spirit and scope thereof.

In the foregoing description, it can be seen that the present invention comprises a new and useful method and mechanism that installs and/or activates a black box 22 for a trusted component 18 residing on a user's computing device 14. Such installation may be performed remotely from the computing device 14 regardless of the privileges of the user of the computing device 14, and where a black box server 24 is not necessarily directly network-accessible to the computing device 14. It should be appreciated that changes could be made to the embodiments described above without departing from the inventive concepts thereof. It should be understood, therefore, that this invention is not limited to the particular embodiments disclosed, but it is intended to cover modifications within the spirit and scope of the present invention as defined by the appended claims.

The invention claimed is:

1. A system for installing a black box on a computing device, the black box operating in combination with a trusted component on the computing device, the trusted component employing the black box to decrypt encrypted content for being rendered on the computing device only when rights and restrictions specified in a license corresponding to the encrypted content so allow, the system comprising:
an administrator having access to the computing device for querying same for machine properties thereof; and
a black box server in communication with the administrator, the black box server receiving machine properties of the computing device from the administrator in response to a request for a new black box for the computing device, the black box server constructing the new black box based in part on the received machine properties so as to tie the new black box to the computing device, and the black box server delivering the new black box to the administrator for installation on the computing device.

2. The system of claim 1 wherein the administrator comprises an activation provider running on the computing device and an activation manager in communication with the activation provider, the activation provider determining the machine properties of the computing device and sending same to the activation manager, the activation manager sending the request to the black box server and receiving the new black box in response thereto, and the activation provider further receiving the new black box from the activation manager and installing same on the computing device.

3. The system of claim 2 wherein the activation manager and the activation provider are constructed in accordance with a management implementation protocol that allows for system management of a computing device.

4. The system of claim 1 wherein the administrator comprises an activation manger, and wherein the activation manager provides a bridge between the computing device and the black box server.

5. A method for installing a black box on a computing device, the black box operating in combination with a trusted component on the computing device, the trusted component employing the black box to decrypt encrypted content for being rendered on the computing device only when rights and restrictions specified in a license corresponding to the encrypted content so allow, the method employing an administrator with access to the computing device and a black box server in communication with the administrator, the method comprising:
the administrator querying the computing device for machine properties thereof and receiving same;
the administrator sending the machine properties of the computing device to the black box server as part of a request for a new black box for the computing device;
the black box server in response constructing the new black box based in part on the machine properties so as to tie the new black box to the computing device;
the black box server delivering the new black box to the administrator; and
the administrator installing the new black box on the computing device.

6. The method of claim 5 wherein the administrator comprises an activation provider running on the computing device and an activation manager in communication with the activation provider, the method comprising:
the activation manager querying the activation provider on the computing device for machine properties thereof;

the activation provider determining the machine properties of the computing device and sending same to the activation manager;

the activation manager sending the machine properties of the computing device to the black box server as part of a request for a new black box for the computing device;

the black box server in response constructing the new black box based in part on the machine properties so as to tie the new black box to the computing device;

the black box server delivering the new black box to the activation manager;

the activation manager delivering the new black box to the activation provider; and the activation provider installing the new black box on the computing device.

7. The method of claim 6 further comprising, prior to the activation manager querying the activation provider on the computing device for machine properties thereof:

the activation manager querying the activation provider to determine whether the computing device requires the new black box;

the activation provider in response collecting activation state information from the computing device and reporting same to the activation manager; and the activation manger determining based on the activation state information whether the computing device requires the new black box.

8. The method of claim 7 comprising the activation provider collecting activation state information from the computing device including whether any black box is present on the computing device, and if so at least one of a version number thereof and a date of activation thereof.

9. The method of claim 7 comprising the activation manager determining whether the computing device requires the new black box based on a rules document setting out a plurality of rules.

10. The method of claim 6 comprising:

the black box server creating a corresponding machine certificate certifying the created black box;

the black box server delivering the new black box and corresponding machine certificate to the activation manager;

the activation manager delivering the new black box and corresponding machine certificate to the activation provider; and the activation provider installing the new black box and corresponding machine certificate on the computing device.

11. The method of claim 10 further comprising:

the black box server selecting a key pair (PR-BB, PU-BB) for the new black box;

the black box server hiding (PR-BB) in the new black box; and the black box server placing (PU-BB) in the corresponding machine certificate and signing the certificate based on (PR-BB).

12. The method of claim 6 comprising the activation provider installing the new black box in a protected location on the computing device.

13. The method of claim 5 wherein the administrator comprises an activation provider running on the computing device and an activation manager in communication with the activation provider, the method comprising:

the activation provider sending a request for a new black box to the activation manager, the request including the machine properties;

the activation manager sending the machine properties of the computing device to the black box server as part of a request for a new black box for the computing device;

the black box server in response constructing the new black box based in part on the machine properties so as to tie the new black box to the computing device;

the black box server delivering the new black box to the activation manager;

the activation manager delivering the new black box to the activation provider; and the activation provider installing the new black box on the computing device.

14. The method of claim 13 comprising:

the black box server creating a corresponding machine certificate certifying the created black box;

the black box server delivering the new black box and corresponding machine certificate to the activation manager;

the activation manager delivering the new black box and corresponding machine certificate to the activation provider; and the activation provider installing the new black box and corresponding machine certificate on the computing device.

15. The method of claim 14 further comprising:

the black box server selecting a key pair (PR-BB, PU-BB) for the new black box;

the black box server hiding (PR-BB) in the new black box; and the black box server placing (PU-BB) in the corresponding machine certificate and signing the certificate based on (PR-BB).

16. The method of claim 13 comprising the activation provider installing the new black box in a protected location on the computing device.

17. A method for deactivating a black box on a computing device, the black box operating in combination with a trusted component on the computing device, the trusted component employing the black box to decrypt encrypted content for being rendered on the computing device only when rights and restrictions specified in a license corresponding to the encrypted content so allow, the method employing an activation provider running on the computing device and an activation manager in communication with the activation provider, the method comprising:

the activation manager querying the activation provider on the computing device for activation state information relating to a state of the black box on the computing device;

the activation provider in response collecting the activation state information from the computing device and reporting same to the activation manger;

the activation manager determining based on the activation state information whether the black box on the computing device remains trustworthy; and the activation manager directing the activation provider to deactivate the black box on the computing device if the activation manager determines based on the activation state information that the black box on the computing device does not remain trustworthy.

18. The method of claim 17 wherein the activation manager and the activation provider are constructed in accordance with a management implementation protocol that allows for system management of a computing device.

19. The method of claim 17 comprising the activation provider collecting activation state information from the computing device including at least one of a version number of the black box on the computing device and a date of activation of the black box on the computing device.

20. The method of claim 17 comprising the activation manager determining whether the black box on the computing device remains trustworthy based on a rules document setting out a plurality of rules that define an activation policy.

21. The method of claim 17 wherein the activation manager directs the activation provider to delete the black box from the computing device if the activation manager determines based on the activation state information that the black box on the computing device does not remain trustworthy.

* * * * *